United States Patent
Gilbert

(10) Patent No.: US 9,374,224 B2
(45) Date of Patent: Jun. 21, 2016

(54) SYSTEM AND METHODS FOR ENCRYPTING DATA

(71) Applicant: RISOFTDEV, Inc., Moraga, CA (US)

(72) Inventor: Vincent Logan Gilbert, Yachats, OR (US)

(73) Assignee: RISOFTDEV, INC., Moraga, CA (US)

( * ) Notice: Subject to any disclaimer, the term of this patent is extended or adjusted under 35 U.S.C. 154(b) by 40 days.

(21) Appl. No.: 14/256,027

(22) Filed: Apr. 18, 2014

(65) Prior Publication Data

US 2014/0314231 A1    Oct. 23, 2014

Related U.S. Application Data

(60) Provisional application No. 61/813,186, filed on Apr. 18, 2013.

(51) Int. Cl.
| | |
|---|---|
| *H04L 9/08* | (2006.01) |
| *H04L 9/32* | (2006.01) |
| *G06F 21/62* | (2013.01) |

(52) U.S. Cl.
CPC .......... *H04L 9/3239* (2013.01); *G06F 21/6218* (2013.01); *H04L 9/0869* (2013.01); *H04L 9/3228* (2013.01); *G06F 2221/2107* (2013.01); *H04L 2209/24* (2013.01)

(58) Field of Classification Search
CPC .......... G06F 21/64; G06F 7/58; G06F 11/30; H04L 9/18; H04L 9/22; H04L 9/26; H04L 9/08; H04L 9/0861; H04L 9/0866; H04L 9/0869
See application file for complete search history.

(56) References Cited

U.S. PATENT DOCUMENTS

| | | | |
|---|---|---|---|
| 5,438,622 A * | 8/1995 | Normile | H04L 9/12 331/78 |
| 5,638,512 A * | 6/1997 | Osman et al. | 726/13 |
| 5,732,138 A | 3/1998 | Noll et al. | |
| 5,835,597 A | 11/1998 | Coppersmith et al. | |
| 6,704,730 B2 | 3/2004 | Moulton et al. | |
| 7,373,517 B1 | 5/2008 | Riggins | |
| 8,094,811 B2 | 1/2012 | Yokota et al. | |
| 8,826,036 B1 * | 9/2014 | Snodgrass et al. | 713/189 |
| 8,938,074 B2 * | 1/2015 | Drucker | H04L 9/0802 380/255 |
| 2004/0141614 A1 | 7/2004 | Choi et al. | |
| 2006/0010203 A1 * | 1/2006 | Mrsic-Flogel et al. | 709/205 |
| 2007/0081667 A1 * | 4/2007 | Hwang | 380/30 |
| 2008/0219449 A1 | 9/2008 | Ball et al. | |
| 2010/0306294 A1 | 12/2010 | Schneider | |
| 2011/0311042 A1 | 12/2011 | Cheddad et al. | |

* cited by examiner

*Primary Examiner* — Samson Lemma
*Assistant Examiner* — Arya Golriz
(74) *Attorney, Agent, or Firm* — Barlow, Josephs & Holmes, Ltd.

(57) ABSTRACT

A system and associated methods for encrypting data are disclosed. In at least one embodiment, a key manager is located in memory on an at least one computing device and configured for creating and managing an at least one encryption key to be used for encrypting the data. An at least one key file is also located in memory on the at least one computing device and is associated with an at least one authorized user. The key file contains a key field comprising a pseudo random string of bytes and a unique hash value used to associate the key file to the user. A set of base characters are randomly selected from the key field, such that the base characters are a subset of the key field. An encryption key is generated by inputting the base characters into an encryption algorithm. The data is encrypted using the encryption key.

18 Claims, 4 Drawing Sheets

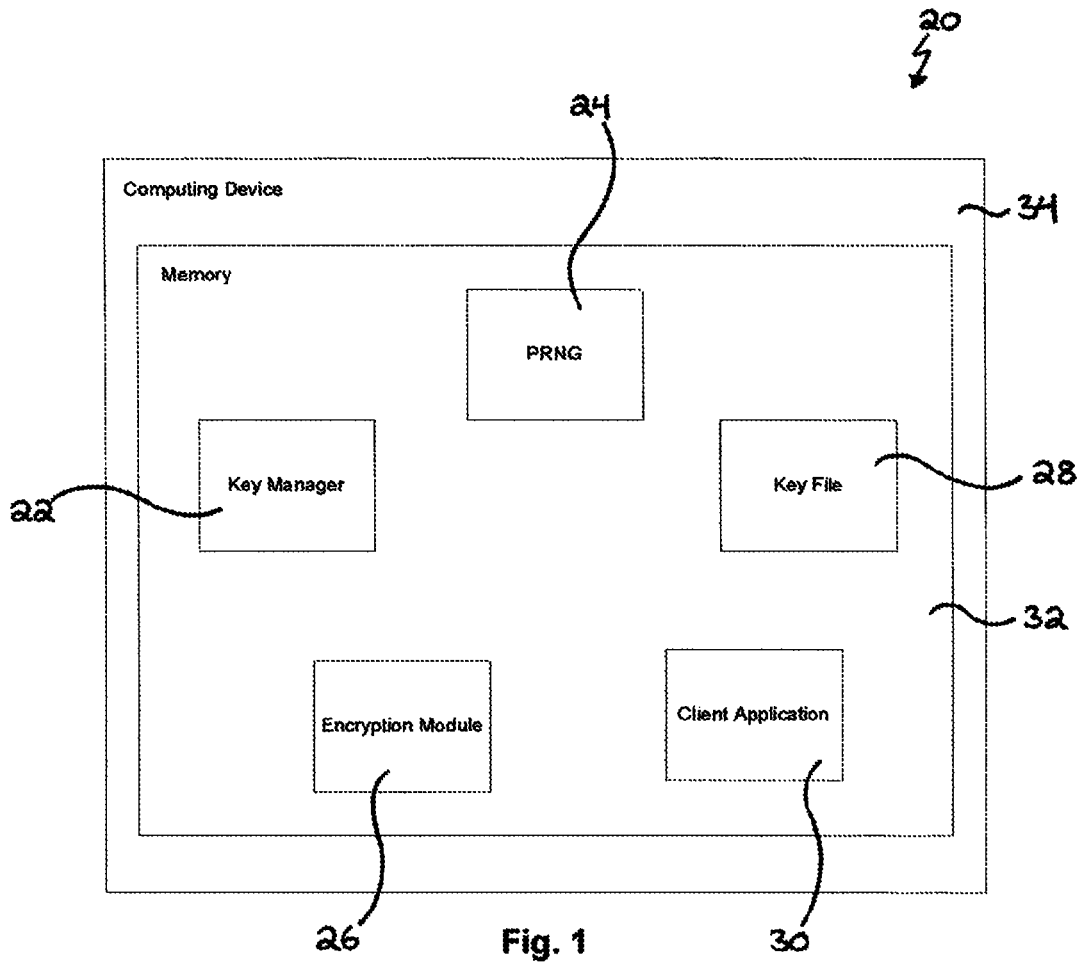
Fig. 1
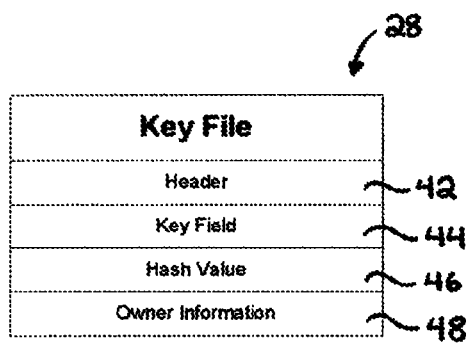
Fig. 2
Fig. 3

SYSTEM AND METHODS FOR ENCRYPTING DATA

RELATED APPLICATIONS

This application claims priority and is entitled to the filing date of U.S. Provisional application Ser. No. 61/813,186, filed on Apr. 18, 2013 and entitled "System and Methods for Encrypting Data." The contents of the aforementioned application are incorporated by reference herein.

INCORPORATION BY REFERENCE

Applicant hereby incorporates herein by reference any and all patents and published patent applications cited or referred to in this application.

BACKGROUND OF THE INVENTION

1. Field of the Invention

Aspects of this invention relate generally to computer cryptography, and more particularly to an improved system and associated methods for encrypting data.

2. Description of Related Art

By way of background, various methods have been developed over the years for securing access to electronic data and related communications. A common method involves the use of symmetrical encryption algorithms, which employ a key for both encrypting and decrypting data. The key is used in such a way that, without it, the data cannot be easily decrypted. The primary problem with such a method is that anyone in possession of the key is able to use it to decrypt the data. Some key obfuscation technologies have attempted to solve this problem by employing a method which encrypts the key using a master key—also known as a black key or key encrypting key ("KEK"). In other words, the key used for encrypting the data is itself encrypted by the KEK. However, such a system is often not useful in diverse applications as they typically require relatively expensive hardware. Furthermore, while this type of system tends to work well in hardware-based systems where the "black box" is relatively secure, it typically does not work well in software-based systems or home/consumer environments, as the issue then becomes where to securely store the KEK. This is because, if the KEK is ever compromised, it renders all of the issued keys vulnerable. Thus, many encryption methods do not rely on encrypting the key with a KEK, and instead simply rely on randomly generated keys.

Electronic devices, such as computers, are often capable of generating random sequences for cryptography along with a variety of other purposes, such as gambling, statistical sampling, computer simulation, and other areas where a random sequence is useful in producing an unpredictable result. Some electronic devices are configured to generate random sequences using a hardware random number generator while others rely on software. These software based techniques often generate a pre-determined number of random sequences. Software of this nature is commonly referred to as a pseudo random number generator ("PRNG") because it does not generate a truly random sequence when compared to a typical hardware random number generator. There are at least two major areas where flaws are exposed in the operation of any PRNG. First, if the seed being used to generate the sequence is not diverse enough, the resultant pseudo random sequence is potentially predictable and therefore poses a risk under the threat of being guessed. Second, even if a sufficiently diverse seed can be produced given the environmental considerations, if those conditions are capable of being determined and thus reproduced, then the resulting pseudo random sequence still poses a risk under the threat of being guessed. Attempts at improving the known prior art have revolved around trying to improve the PRNG itself by various means related to increasing the entropy of random seeds. The problem with these types of solutions, however, is that they require the improvement be incorporated into the PRNG being used. Thus, there is a need for increasing the security and performance of such a PRNG without requiring that the functionality of the PRNG be altered.

A further problem associated with prior art PRNG's is the relative probabilities associated with a particular number or character being included in the pseudo random value. In a bit more detail, when generating a numerical sequence, a PRNG must choose one of ten whole number values: 0, 1, 2, 3, 4, 5, 6, 7, 8, or 9. Regardless of the means used to generate a pseudo random value, that final value must be with in this range. The same would be true of pseudo random alphanumeric values (i.e., 0-9 and A-Z, possibly even including other ASCII characters). Depending on the strength of the PRNG a random sequence of ten places might be as weak as 7526435744, for example. The likelihood of a number being included increases as the length of the generated sequence is increased. Therefore a sequence that is twice as long is more likely to include a number outside of those selected in the original sequence (ex., 30820913007504796977). This likelihood increases as the length of the pseudo random sequence increases. Furthermore, once the key length is determined, cracking an encryption key is as simple as running through each permutation of number combinations for a key of that length.

Another problem associated with known prior art symmetrical encryption algorithms is that they, either by design or in their implementation, will either output nothing or will throw an error or exception when an attempt is made to use an incorrect key. This, in turn, facilitates the use of automated or semi-automated brute force cracking techniques to determine the correct key. All the person who is attempting the crack needs to do is run through every possible combination of characters that potentially comprise the key until a readable output is achieved. Theoretical encryption algorithms that would output readable data when presented with a bad key have been rejected as being impractical due to the unknown nature of the data which was encrypted.

Aspects of the present invention are directed to solving all of these problems and provide further related advantages as described in the following summary.

SUMMARY OF THE INVENTION

Aspects of the present invention teach certain benefits in construction and use which give rise to the exemplary advantages described below.

The present invention solves the problems described above by providing a system and associated methods for encrypting data. In at least one embodiment, a key manager is located in memory on an at least one computing device and configured for creating and managing an at least one encryption key to be used for encrypting the data. An at least one key file is also located in memory on the at least one computing device and is associated with an at least one authorized user. The key file contains a key field comprising a pseudo random string of bytes and a unique hash value used to associate the key file to the user. A set of base characters are randomly selected from the key field, such that the base characters are a subset of the key field. An encryption key is then generated by inputting the base characters into an encryption algorithm. The data is then encrypted using the encryption key.

A primary objective inherent in the above described apparatus and method of use is to provide advantages not taught by the prior art.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings:

FIG. 1 is an architecture diagram of an exemplary system for encrypting data, in accordance with at least one embodiment;

FIG. 2 is a block diagram illustrating an exemplary key file data structure, in accordance with at least one embodiment;

FIG. 3 is an illustration of an exemplary key field, in accordance with at least one embodiment;

Figure 4:
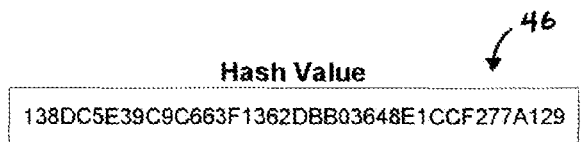
FIG. 4 is an illustration of an exemplary hash value, in accordance with at least one embodiment.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION OF THE INVENTION

The above described drawing figures illustrate aspects of the invention in at least one of its exemplary embodiments, which are further defined in detail in the following description.

Turning now to FIG. 1, there is shown an architecture diagram of an exemplary system 20 for encrypting data, in accordance with at least one embodiment. The system 20 comprises, in the exemplary embodiment, a key manager 22, a pseudo random number generator ("PRNG") 24, an encryption module 26, an at least one key file 28, and an at least one client application 30, each residing in memory 32 on an at least one computing device 34. It should be noted that the term "memory" is intended to include any type of electronic storage medium (or combination of storage mediums) now known or later developed, such as local hard drives, RAM, flash memory, external storage devices, network or cloud storage devices, etc. Furthermore, the various components of the system 20 may reside in memory 32 on a single computing device 34, or may separately reside on two or more computing devices 34. Additionally, the term "computing device" is intended to include any type of computing device now known or later developed, such as desktop computers, smartphones, laptop computers, tablet computers, gaming devices, etc.

With continued reference to FIG. 1, in at least one embodiment, the key manager 22 creates and manages one or more encryption keys that are used to encrypt sensitive data 36 and permit only authorized users to reveal or otherwise access the sensitive data 36. As discussed further below, in at least one embodiment, the key manager 22 utilizes the PRNG 24 during certain steps in creating the encryption key.

In at least one embodiment, the encryption module 26 carries out the process of receiving sensitive data 36 and generating a token 38 to be used in its place. In other words, using the associated encryption key, the encryption module 26 generates the token 38, encrypts the original sensitive data 36, and stores the encrypted data 40 in memory 32. The token 38 is simply a reference to the encrypted data 40; there is no mathematical relationship between the token 38 and the encrypted data 40. Therefore, the token 38 may be safely used throughout the system 20, while the encrypted data 40 it represents remains stored in memory 32. The encryption module 26 ensures that there is a one-to-one relationship between the sensitive data 36 and the generated token 38, so that referential integrity is maintained throughout the system 20.

The at least one client application 30 may be any of a variety of applications or platforms, now known or later developed, involved in the collection, handling, or processing of sensitive data 36 and configured for communicating with the key manager 22 and encryption module 26 for encrypting and decrypting the sensitive data 36. For example, the client application 30 may be a financial application for processing or analyzing payments received by a business enterprise. Another client application 30 may be a point-of-sale device such as a cash register or payment card reader.

As shown in FIG. 2, an exemplary embodiment of the at least one key file 28 is illustrated by way of example as a data structure that stores certain values associated with an encryption key. In at least one alternate embodiment, the key file 28 is a text file. The key file 28 comprises, in at least one embodiment, a header 42, a key field 44, a hash value 46, and owner information 48. The header 42 contains certain version information for the key file 28. As shown in the exemplary illustration of FIG. 3, the key field 44 is a pseudo random string of bytes. In the exemplary embodiment, the key field 44 is generated by the PRNG 24; however, in alternate embodiments, the key field 44 may be generated by any other suitable means, now known or later developed, capable of generating a random or pseudo random string of bytes. As shown in the exemplary illustration of FIG. 4, the hash value 46 is a unique identifier that is generated and locks the key file 28 to its associated owner (i.e., user), and to the originating computing device 34. However, in at least one embodiment, the system 20 provides an export function that allows the key file 28 to be portable for use on different computing devices. The details of how each of the key field 44 and hash value 46 is derived (along with the associated encryption key), in at least one embodiment, are discussed below. Referring again to FIG. 2, the owner information 48 contains details related to the owner of the key file 28, such as a username, IP address, etc.

As mentioned above, the system 20 does not encrypt the encryption key. Thus, the system 20 does not rely upon a KEK. Instead, and as illustrated in the flow diagram of FIG. 5, the key manager 22 first generates the key field 44 as a pseudo random string of bytes, or characters (100). In use, in at least one embodiment, before proceeding further, the system 20 verifies whether the user is new (102). For new users, the system 20 prompts the user to enter certain user-specific variables, such as a username and a passphrase (104). Select data, such as the key field 44, passphrase and other environmental and/or user-supplied variables (i.e., computing device date and/or time, operating system version, username, IP address, etc.) is input into a hash function which, in turn, derives the unique hash value 46 (106). Upon using the system 20 again, the user identity and associated access rights are verified based on the hash value 46 (108). In one such embodiment, the user is prompted to re-enter their passphrase, upon which the system 20 then performs the hash function using the same variables so as to compare the result with the hash value 46 stored in the user's key file 28. In an alternate embodiment, the system 20 simply checks to see whether the user has a key file 28 already stored in memory 32.

Figure 6:
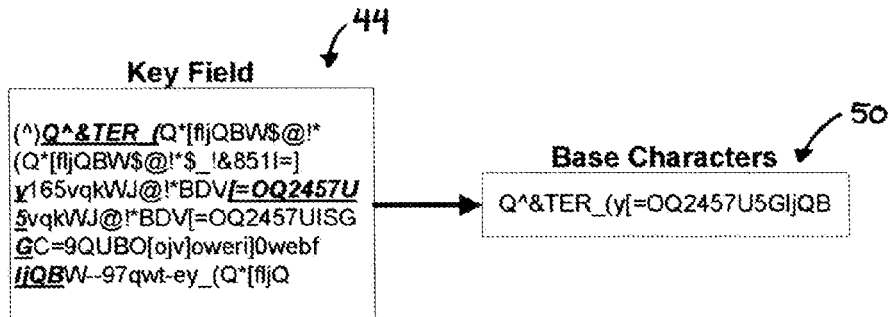
FIG. 6 is an illustration of an exemplary set of base characters as derived from the exemplary key field, in accordance with at least one embodiment.

Next, as illustrated in FIG. 6, the key manager 22 employs a key extraction algorithm to construct a set of base characters 50 that are randomly selected from the key field 44 (110). The set of base characters 50 is relatively smaller than the key field 44, and the particular characters to be randomly (and preferably non-contiguously) selected from the key field 44 are determined by the key extraction algorithm based on various environmental and/or user-supplied variables. In this way, the key file 28 magnifies entropy by increasing the number of characters randomly generated in the key field 44, and then randomly selecting the string length needed from within this extended group to arrive at the set of base characters 50. In other words, the use of the key file 28 greatly decreases the chance that disparate installations of the system 20 will duplicate a given key field 44. With respect to the key extraction algorithm used to construct the set of base characters 50, the details of that algorithm will not be disclosed herein, so as to safeguard the integrity of the system 20 and associated methods of encrypting sensitive data 36. Furthermore, because the set of base characters 50 is not visible, any attempts to reverse engineer the key extraction algorithm would be arduous at best.

Figure 5:
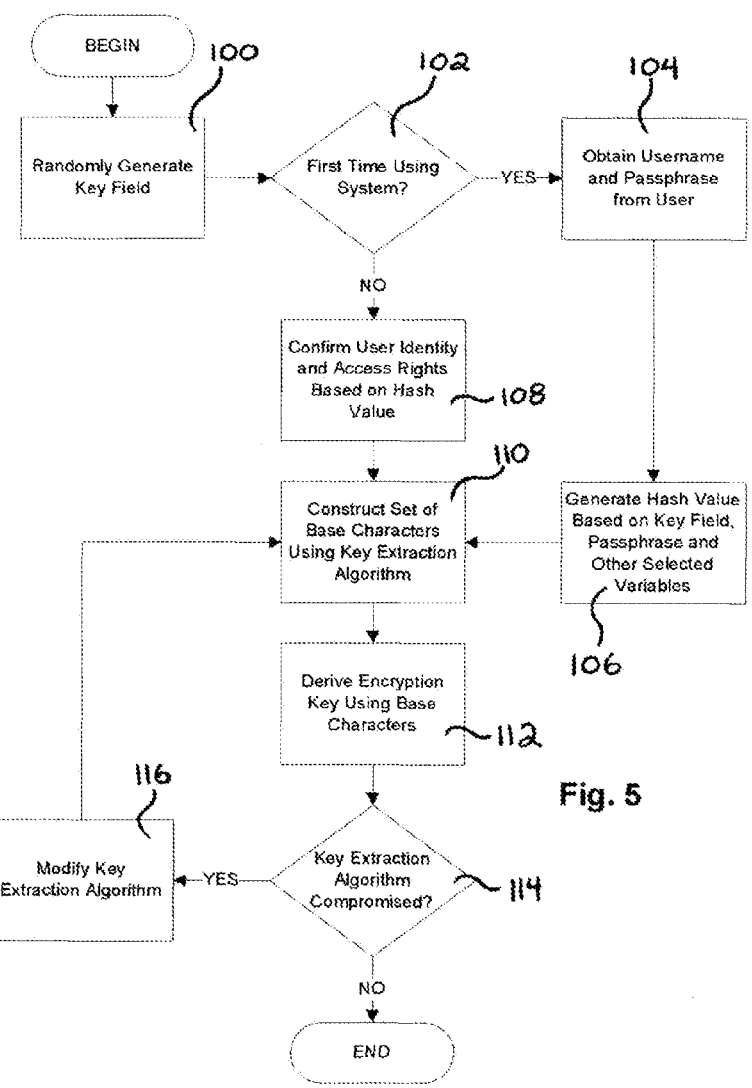
FIG. 5 is a flow diagram of an exemplary method for encrypting data, in accordance with at least one embodiment.

With continued reference to FIG. 5, once constructed, the set of base characters 50 is input into an encryption algorithm which, in turn, derives the encryption key (112). The encryption module 26 is then able to encrypt the sensitive data 36 using the encryption key. In the exemplary embodiment, the key manager 22 is also capable of specifying the desired length of the encryption key, allowing the system 20 to generate encryption keys that are compatible with virtually any encryption algorithm for use in virtually any encryption module.

It is also well recognized that, given enough time, resources and access to a particular encryption system, including the exemplary system 20 herein described, a dedicated individual or group of individuals will be able to discern its mechanics. With this in mind, most encryption algorithms are made public and depend on mathematical complexity for obfuscation. The present system 20, on the other hand, utilizes a form of extensible obfuscated algorithm encryption, wherein the algorithm which creates the encryption key (i.e., the key extraction algorithm) is hidden. Furthermore, it is accepted that, given access to enough encryption keys, a dedicated effort would be able to eventually discern the key extraction algorithm. However elements of the key extraction algorithm are extensible; that is, they can be altered simply (116), and without changing the fundamental mechanics of the key extraction algorithm. Thus, since the key extraction algorithm is meant to be used by a known group, the updated version of the key extraction algorithm can be made available to this group within a pre-determined amount of time (based upon the estimated amount of time required for the key extraction algorithm to be cracked), or upon a determination that the key extraction algorithm is actually compromised (114). The existing encryption key is exported and a new encryption key, using the updated key extraction algorithm is sent to the user. As such, anyone attempting to crack the key extraction algorithm would be forced to start over. The design of the key extraction algorithm allows for a nearly limitless number of patterns, given the large number and possible combinations of various environmental and/or user-supplied variables that the key extraction algorithm could utilize, not to mention the wide range of potentially unique values each such variable could have.

Figure 7:
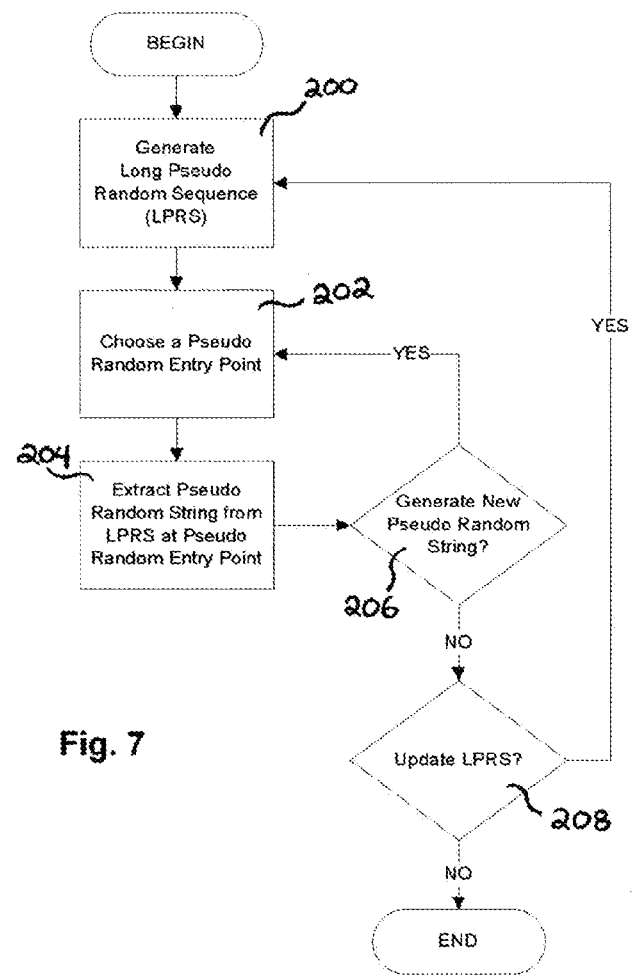
FIG. 7 is a flow diagram of an exemplary method for generating a pseudo random string of bytes, in accordance with at least one embodiment.
Figure 8:
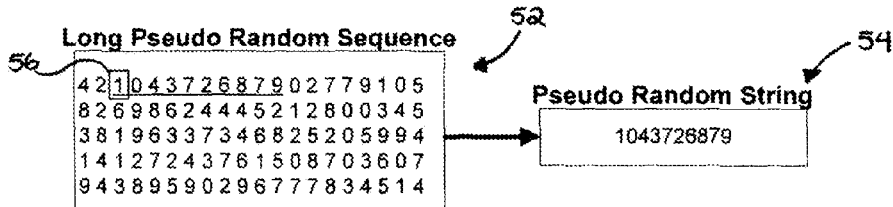
FIG. 8 is an illustration of an exemplary pseudo random string as derived from an exemplary long pseudo random sequence, in accordance with at least one embodiment.

As mentioned above, in at least one embodiment, the key field 44 is generated by the PRNG 24. In one such embodiment, as illustrated in the flow diagram of FIG. 7, the PRNG 24 first generates a long pseudo random sequence ("LPRS") 52 of numbers and/or characters (200). An exemplary illustration of the LPRS 52 is shown in FIG. 8. Next, the PRNG 24 constructs a pseudo random string 54 by choosing a pseudo random entry point 56 (202) and selecting a pre-defined number of consecutive digits (and/or characters) in the LPRS 52, beginning at the pseudo random entry point 56 (204). As an example, and as shown in the exemplary illustration of FIG. 8, if the PRNG 24 chooses a pseudo random entry point 56 of "3," and the length of the pseudo random string 54 is to be "10," the resulting pseudo random string 54 as derived from the LPRS 52 of FIG. 8 would be "1043726879." Further pseudo random strings 54 may be generated as needed (206). In still further embodiments, the PRNG 24 constructs the pseudo random string 54 by selecting a pre-defined number of non-consecutive digits (and/or characters) in the LPRS 52, beginning at the pseudo random entry point 56. In this way, by storing the LPRS 52 in memory 32 and constructing the pseudo random string 54 of relatively shorter length therefrom, the entropy of the PRNG 24 is thereby increased. Additionally, in embodiments where the memory 32 of the system 20 is not local to the computing device 34 hosting the PRNG 24, the LPRS 52 forms an abstraction layer which prevents someone attempting to guess the pseudo random string 54 from using knowledge of the hardware of the computing device 34 as a basis for that guess. Simply put, in at least one embodiment, the LPRS 52 can be generated on one computing device 34 and utilized on another.

One possible limitation of the above-described embodiment of the PRNG 24 is that it does not allow for the automatic updating of the LPRS 52. In a bit more detail, and with continued reference to the exemplary LPRS 52 of FIG. 8, there are 90 possible unique 10-character pseudo random strings 54 which can be used by simply taking a pseudo random entry point 56 and counting forward 10 characters. Since any computing device 34 used to accomplish this would use a PRNG 24 to select the pseudo random entry point 56, the actual number of unique pseudo random strings 54 that could be selected before seeing repeats would be far lower. In order to circumvent this limitation, in at least one embodiment, an extended architecture is utilized which allows for the storage and retrieval of the character set that was used to create the LPRS 52. This allows for the automatic periodic updating of the LPRS 52 (208), based on the character set, which reduces the likelihood that a particular pseudo random string 54 will be repeated.

It should be noted that, while the PRNG 24 is discussed herein in the context of the exemplary data encryption system 20, the PRNG 24 may in fact be separately utilized in any other application where a pseudo random byte, or series of pseudo random bytes, is needed.

Figure 9:
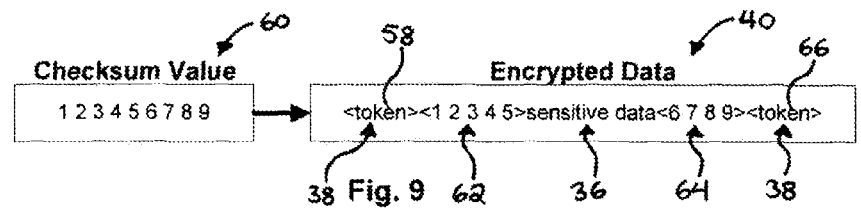
FIG. 9 is an illustration of an exemplary piece of sensitive data as encrypted with a known token, in accordance with at least one embodiment.

In at least one embodiment, the system 20 employs further steps for combating and decreasing the probability of brute force attempts at cracking the encryption key and/or key extraction algorithm. In short, as shown in the exemplary illustration of FIG. 9, the system 20 includes a token 38 at the beginning and the end of the sensitive data 36 that is to be encrypted. Because the token 38 is a known value, and because the token 38 is created using the same encryption key, any encryption key that is not the key used to encrypt the sensitive data 36 (and, thus, the token 38) will not correctly reconstruct the token 38 upon decryption. In this way, it can be readily determined if an encryption key is the correct key. In further embodiments, methods are employed to output data other than the encrypted data 40. As a result, since there is no way for the person attempting to brute force crack the encrypted data 40 to know whether the data they are viewing is identical to the sensitive data 36 which was encrypted, the number of cycles needed to crack the encryption key and/or key extraction algorithm becomes extremely high.

Figure 10:
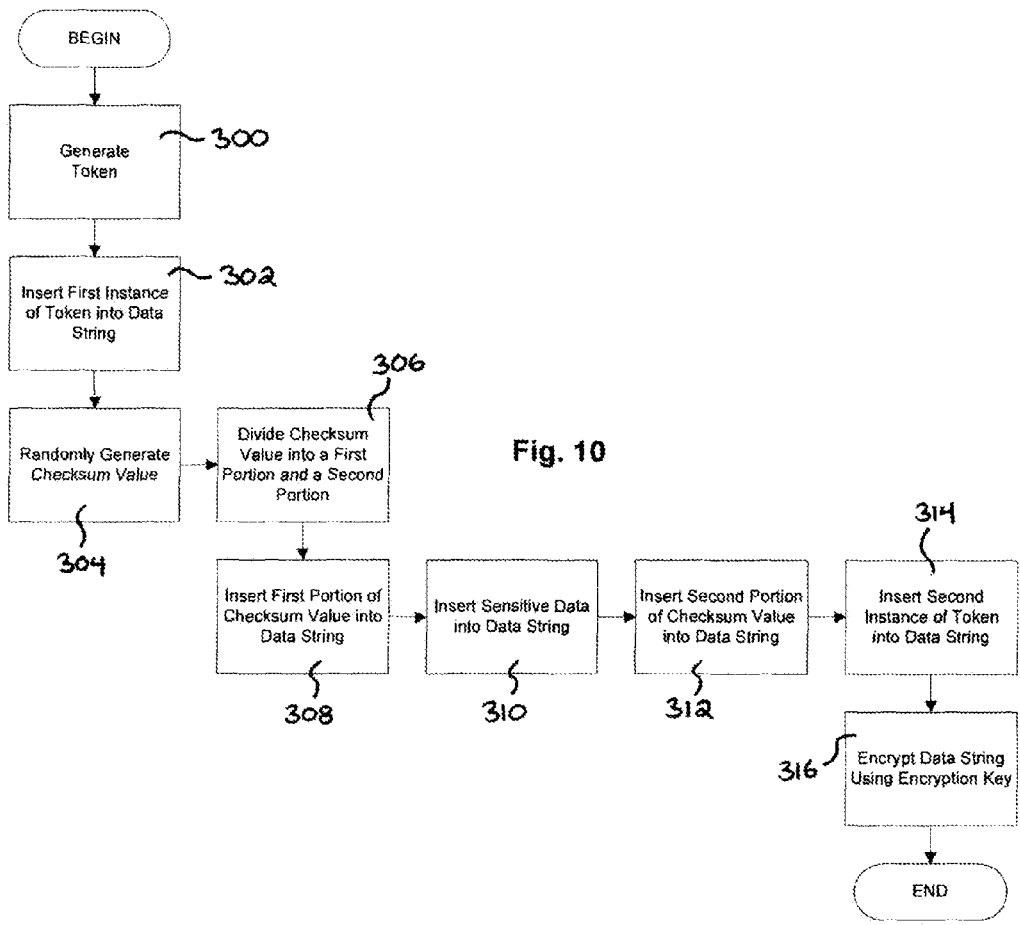
FIG. 10 is a flow diagram of an exemplary method for combating brute force cracking attempts, in accordance with at least one embodiment.

In one such embodiment, as illustrated in the flow diagram of FIG. 10, the encryption module 26 first generates a token 38 having a known value (300) and inserts a first instance 58 of the known token 38 at the beginning of the sensitive data 36 to be encrypted (302). Next, a checksum value 60 is randomly generated (304). In the exemplary embodiment, the checksum value 60 is generated by the PRNG 24, in accordance with the method described above; however, in alternate embodiments, the checksum value 60 may be generated by any other suitable means, now known or later developed, capable of generating such a random or pseudo random string of bytes. The checksum value 60 is then divided into a first portion 62 and a second portion 64 (306). The first portion 62 of the checksum value 60 is inserted after the first instance 58 of the token (308), followed by the sensitive data 36 (310), followed by the second portion 64 of the checksum value 60 (312), followed by a second instance 66 of the token 38 (314). The entire string of data is then encrypted using the encryption key (316). Thus, the second portion 64 of the checksum value 60, following the sensitive data 36 to be encrypted, has a known relationship to the first portion 62 of the checksum value 60. In the exemplary illustration of FIG. 9, the checksum value 60 comprises a series of integers beginning in the first portion 62 and continuing in the second portion 64. This guarantees that any variance in the encryption key will produce a detectable corruption in either the token 38 or the checksum value 60. Since the value of the token 38 is known, the encryption module 26 can detect if it is corrupted or partially corrupted due to being partially decrypted. This allows the encryption module 26 to employ various techniques to output data that is readable but false.

To summarize, regarding the exemplary embodiments of the present invention as shown and described herein, it will be appreciated that a system and method for encrypting data is disclosed. Because the principles of the invention may be practiced in a number of configurations beyond those shown and described, it is to be understood that the invention is not in any way limited by the exemplary embodiments, but is generally directed to a system and method for encrypting data and is able to take numerous forms to do so without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention. Furthermore, the various features of each of the above-described embodiments may be combined in any logical manner and are intended to be included within the scope of the present invention.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may be comprise one or more modules that execute on one or more processors in a distributed, non-distributed, or multiprocessing environment.

The method as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections of buried interconnections). In any case, the chip is then integrated with other chips, discrete circuit elements, and/or other signal processing devices as part of either (a) an intermediate product, such as a motherboard, or (b) and end product. The end product can be any product that includes integrated circuit chips, ranging from toys and other low-end applications to advanced computer products having a display, a keyboard or other input device, and a central processor.

Aspects of the present specification may also be described as follows:

1. A computer-implemented method for encrypting data comprising the steps of: implementing a key manager in memory on an at least one computing device, said key manager configured for creating and managing an at least one encryption key to be used for encrypting the data; implementing an at least one key file in memory on the at least one computing device, said key file associated with an at least one authorized user and containing a key field comprising a pseudo random string of bytes and a unique hash value used to associate the key file to said at least one user; constructing a set of base characters that are randomly selected from the key field, the set of base characters being a subset of the key field; generating the encryption key by inputting the base characters into an encryption algorithm; receiving the data to be encrypted; and encrypting the data using the encryption key.

2. The method according to embodiment 1, further comprising the step of generating the key field, using the key manager, as a pseudo random string of bytes.

3. The method according to embodiments 1-2, further comprising the step of, upon determining that the user is new, obtaining select user-specific information from the user, said information including at least one of a username, a passphrase, a current date associated with the user's computing device, a current time associated with the user's computing device, an operating system version associated with the user's computing device, and an IP address associated with the user's computing device.

4. The method according to embodiments 1-3, further comprising the step of generating the unique hash value by inputting at least a portion of the user-specific information into a hash function.

5. The method according to embodiments 1-4, further comprising the step of, upon determining that the user is not new, verifying the identity of the user based on the hash value.

6. The method according to embodiments 1-5, further comprising the steps of: prompting the user to re-enter the passphrase; performing the hash function using the same user-specific information used to previously generate the hash value; and comparing the result to the hash value stored in the key file associated with the user to determine whether the result and the hash value are identical.

7. The method according to embodiments 1-6, wherein the step of constructing a set of base characters further comprises the step of randomly selecting non-contiguous characters from the key field.

8. The method according to embodiments 1-7, wherein the step of constructing a set of base characters further comprises the step of randomly selecting characters from the key field using a key extraction algorithm.

9. The method according to embodiments 1-8, further comprising the step of, upon determining that the key extraction algorithm has been compromised, modifying the key extraction algorithm and distributing it to the at least one authorized user.

10. The method according to embodiments 1-9, further comprising the step of generating the key field using a pseudo random number generator ("PRNG").

11. The method according to embodiments 1-10, further comprising the steps of: generating a long pseudo random sequence ("LPRS") of bytes; and constructing a pseudo random string by choosing a pseudo random entry point into the LPRS and selecting a pre-determined number of bytes in the LPRS beginning at the pseudo random entry point.

12. The method according to embodiments 1-11, wherein the step of constructing a pseudo random string further comprises the step of selecting a pre-determined number of consecutive bytes in the LPRS beginning at the pseudo random entry point.

13. The method according to embodiments 1-12, wherein the step of constructing a pseudo random string further comprises the step of selecting a pre-determined number of non-consecutive bytes in the LPRS beginning at the pseudo random entry point.

14. The method according to embodiments 1-13, further comprising the step of implementing the PRNG in memory on the at least one computing device.

15. The method according to embodiments 1-14, further comprising the step of implementing an at least one client application in memory on the at least one computing device, said client application configured for communicating with the key manager and encryption module for encrypting and decrypting the sensitive data.

16. The method according to embodiments 1-15, wherein the step of encrypting the data further comprises the steps of: generating a token having a known value; inserting a first instance of the token at the beginning of the data; randomly generating a checksum value; dividing the checksum value into a first portion and a second portion; inserting the first portion of the checksum value between the first instance of the token and the beginning of the data; inserting the second portion of the checksum value at the end of the data; inserting a second instance of the token after the second portion of the checksum value; and encrypting the entire string of the first instance of the token, first portion of the checksum value, data, second portion of the checksum value, and second instance of the token using the encryption key.

17. The method according to embodiments 1-16, wherein the step of randomly generating a checksum value further comprises the step of generating a series of integers beginning in the first portion of the checksum value and continuing in the second portion of the checksum value, such that said first portion has a known relationship to said second portion.

18. The method according to embodiments 1-17, further comprising the step of, upon detecting a corrupted or partially corrupted token due to being decrypted with an incorrect encryption key, outputting data that is readable but false.

19. A computer-implemented method for encrypting data comprising the steps of: implementing a key manager in memory on an at least one computing device, said key manager configured for creating and managing an at least one encryption key to be used for encrypting the data; implementing an at least one key file in memory on the at least one computing device, said key file associated with an at least one authorized user and containing a key field comprising a pseudo random string of bytes and a unique hash value used to associate the key file to said at least one user; generating the key field by: generating a long pseudo random sequence ("LPRS") of bytes; and constructing a pseudo random string by choosing a pseudo random entry point into the LPRS and selecting a pre-determined number of bytes in the LPRS beginning at the pseudo random entry point; constructing a set of base characters that are randomly selected from the key field, the set of base characters being a subset of the key field; generating the encryption key by inputting the base characters into an encryption algorithm; receiving the data to be encrypted; and encrypting the data using the encryption key.

20. A computer-implemented method for encrypting data comprising the steps of: implementing a key manager in memory on an at least one computing device, said key manager configured for creating and managing an at least one encryption key to be used for encrypting the data; implementing an at least one key file in memory on the at least one computing device, said key file associated with an at least one authorized user and containing a key field comprising a pseudo random string of bytes and a unique hash value used to associate the key file to said at least one user; constructing a set of base characters that are randomly selected from the key field, the set of base characters being a subset of the key field; generating the encryption key by inputting the base characters into an encryption algorithm; generating a token having a known value; inserting a first instance of the token at the beginning of the data; randomly generating a checksum value; dividing the checksum value into a first portion and a second portion; inserting the first portion of the checksum value between the first instance of the token and the beginning of the data; inserting the second portion of the checksum value at the end of the data; inserting a second instance of the token after the second portion of the checksum value; and encrypting the entire string of the first instance of the token, first portion of the checksum value, data, second portion of the checksum value, and second instance of the token using the encryption key.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A computer-implemented method for creating an encryption key, as carried out by a computer processor, the method comprising the steps of:
   implementing a key manager in a memory on an at least one computing device, said key manager configured for creating and managing an at least one encryption key to be used for encrypting the data;
   implementing an at least one key file in said memory on the at least one computing device, said key file associated with an at least one authorized user and containing a key field comprising a pseudo random string of bytes;
   constructing a set of base characters that are randomly selected by the computer processor performing a key extraction algorithm from the key field, the set of base characters being a subset of the key field with at least one such randomly selected character from the key field being non-contiguous with at least one other such randomly selected character from the key field, such that the at least one such randomly selected character and the at least one other such randomly selected character are not connected in an unbroken sequence of characters within the key field;
   generating the encryption key by inputting the base characters into an encryption algorithm;
   receiving, from a remote computing device, the data to be encrypted over a network; and
   encrypting the data using the encryption key and sending the encrypted data over the network to the remote computing device.

2. The method of claim 1, further comprising the step of generating the key field, using the key manager, as a pseudo random string of bytes.

3. The method of claim 1, further comprising the step of, upon determining that the user is new, obtaining select user-specific information from the user, said information including at least one of a username, a passphrase, a current date associated with the user's computing device, a current time associated with the user's computing device, an operating system version associated with the user's computing device, and an IP address associated with the user's computing device.

4. The method of claim 3, further comprising the step of generating a unique hash value, used to associate the key file to said at least one authorized user, by inputting at least a portion of the user-specific information into a hash function.

5. The method of claim 4, further comprising the step of, upon determining that the user is not new, verifying the identity of the user based on the hash value.

6. The method of claim 5, further comprising the steps of:
   prompting the user to re-enter the passphrase;
   performing the hash function using the same user-specific information used to previously generate the hash value; and
   comparing the result to the hash value stored in the key file associated with the user to determine whether the result and the hash value are identical.

7. The method of claim 5, further comprising the step of, upon determining that the key extraction algorithm has been compromised, modifying the key extraction algorithm and distributing it to the at least one authorized user.

8. The method of claim 1, further comprising the step of generating the key field using a pseudo random number generator ("PRNG").

9. The method of claim 8, further comprising the steps of:
   generating a long pseudo random sequence ("LPRS") of bytes; and
   constructing a pseudo random string by choosing a pseudo random entry point into the LPRS and selecting a pre-determined number of bytes in the LPRS beginning at the pseudo random entry point.

10. The method of claim 9, wherein the step of constructing a pseudo random string further comprises the step of selecting a pre-determined number of consecutive bytes in the LPRS beginning at the pseudo random entry point.

11. The method of claim 9, wherein the step of constructing a pseudo random string further comprises the step of selecting a pre-determined number of non-consecutive bytes in the LPRS beginning at the pseudo random entry point.

12. The method of claim 8, further comprising the step of implementing the PRNG in said memory on the at least one computing device.

13. The method of claim 1, further comprising the step of implementing an at least one client application in said memory on the at least one computing device, said client application configured for communicating with the key manager and encryption module for encrypting and decrypting the sensitive data.

14. The method of claim 1, wherein the step of encrypting the data further comprises the steps of:
   generating a token having a known value;
   inserting a first instance of the token at the beginning of the data;
   randomly generating a checksum value;
   dividing the checksum value into a first portion and a second portion;
   inserting the first portion of the checksum value between the first instance of the token and the beginning of the data;
   inserting the second portion of the checksum value at the end of the data;
   inserting a second instance of the token after the second portion of the checksum value; and
   encrypting the entire string of the first instance of the token, first portion of the checksum value, data, second portion of the checksum value, and second instance of the token using the encryption key.

15. The method of claim 14, wherein the step of randomly generating a checksum value further comprises the step of generating a series of integers beginning in the first portion of the checksum value and continuing in the second portion of the checksum value, such that said first portion has a known relationship to said second portion.

16. The method of claim 14, further comprising the step of, upon detecting a corrupted or partially corrupted token due to being decrypted with an incorrect encryption key, outputting data that is readable but false.

17. A computer-implemented method for creating an encryption key, as carried out by a computer processor, the method comprising the steps of:
   implementing a key manager in a memory on an at least one computing device, said key manager configured for creating and managing an at least one encryption key to be used for encrypting the data;
   generating a key field by:
      generating a long pseudo random sequence ("LPRS") of bytes; and
      constructing a pseudo random string by choosing a pseudo random entry point into the LPRS and selecting a pre-determined number of bytes in the LPRS beginning at the pseudo random entry point;
   constructing a set of base characters that are randomly selected by the computer processor performing a key extraction algorithm from the key field, the set of base characters being a subset of the key field with at least one such randomly selected character from the key field being non-contiguous with at least one other such randomly selected character from the key field, such that the at least one such randomly selected character and the at least one other such randomly selected character are not connected in an unbroken sequence of characters within the key field;

generating the encryption key by inputting the base characters into an encryption algorithm;

receiving, from a remote computing device, the data to be encrypted over a network; and encrypting the data using the encryption key and sending the encrypted data over the network to the remote computing device.

18. A computer-implemented method for creating an encryption key, as carried out by a computer processor, the method comprising the steps of:

implementing a key manager in a memory on an at least one computing device, said key manager configured for creating and managing an at least one encryption key selected by the computer processor performing a key extraction algorithm, the encryption key to be used for encrypting the data;

generating a token having a known value;

inserting a first instance of the token at the beginning of the data;

randomly generating a checksum value;

dividing the checksum value into a first portion and a second portion;

inserting the first portion of the checksum value between the first instance of the token and the beginning of the data;

inserting the second portion of the checksum value at the end of the data;

inserting a second instance of the token after the second portion of the checksum value; and encrypting the entire string of the first instance of the token, first portion of the checksum value, data, second portion of the checksum value, and second instance of the token using the encryption key, and sending the encrypted entire string of the first instance of the token, first portion of the checksum value, the data, the second portion of the checksum value, and the second instance of the token over a network to a remote computing device.

* * * * *